US008073054B2

(12) United States Patent
Hekstra et al.

(10) Patent No.: US 8,073,054 B2
(45) Date of Patent: Dec. 6, 2011

(54) UNIT FOR AND METHOD OF ESTIMATING A CURRENT MOTION VECTOR

(75) Inventors: Gerben Johan Hekstra, Eindhoven (NL); Stephan Oliver Mietens, Eindhoven (NL); Peter Hendrik Nelis De With, Son en Breugel (NL)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1162 days.

(21) Appl. No.: 10/501,424

(22) PCT Filed: Dec. 12, 2002

(86) PCT No.: PCT/IB02/05503
§ 371 (c)(1),
(2), (4) Date: Jul. 13, 2004

(87) PCT Pub. No.: WO03/061293
PCT Pub. Date: Jul. 24, 2003

(65) Prior Publication Data
US 2005/0063467 A1    Mar. 24, 2005

(30) Foreign Application Priority Data
Jan. 17, 2002    (EP) .................................... 02075179

(51) Int. Cl.
*H04N 7/12*    (2006.01)
*H04N 11/02*    (2006.01)
*H04N 11/04*    (2006.01)

(52) U.S. Cl. ......... 375/240.16; 375/240.12; 375/240.13; 375/240.14; 375/240.15

(58) Field of Classification Search .............. 375/240.12, 375/241.16, 240.16, 240.24
See application file for complete search history.

(56) References Cited

U.S. PATENT DOCUMENTS

| 5,428,403 | A |   | 6/1995  | Andrew et al. |         |
|-----------|---|---|---------|---------------|---------|
| 5,557,341 | A | * | 9/1996  | Weiss et al.  | 348/699 |
| 5,647,049 | A |   | 7/1997  | Odaka et al.  |         |
| 5,978,048 | A |   | 11/1999 | Lee           |         |
| 6,011,870 | A |   | 1/2000  | Jeng et al.   |         |

(Continued)

FOREIGN PATENT DOCUMENTS
EP    0496051    9/1996
(Continued)

OTHER PUBLICATIONS

Orchard, M.T.: "Predictive motion-field segmentation for image sequence coding"; IEEE Tranactions on Circuits and Systems for Video Technology, IEEE Inc. New York, US, vol. 3., No. 1, Feb. 1, 1993, pp. 54-70, XP000334579, ISSN: 1051-8215.

(Continued)

*Primary Examiner* — Christopher S Kelley
*Assistant Examiner* — Chikaodili E Anyikire
(74) *Attorney, Agent, or Firm* — DLA Piper LLP (US)

(57) ABSTRACT

A motion estimation unit (500) for estimating a current motion vector comprises a match error unit (506) for calculating match errors of respective candidate motion vectors and a selector (508) for selecting the current motion vector from the candidate motion vectors by means of comparing the match errors of the respective candidate motion vectors. Some of the candidate motion vectors are extracted from a set of previously estimated motion vectors. Other candidate motion vectors are calculated based on multiple motion vectors which are selected from the set of previously estimated motion vectors.

18 Claims, 6 Drawing Sheets

U.S. PATENT DOCUMENTS

| | | | |
|---|---|---|---|
| 6,157,677 A * | 12/2000 | Martens et al. | 375/240.16 |
| 6,208,760 B1 | 3/2001 | De Haan et al. | |
| 6,240,211 B1 * | 5/2001 | Mancuso et al. | 382/236 |
| 6,278,736 B1 * | 8/2001 | De Haan et al. | 375/240.16 |
| 6,317,460 B1 | 11/2001 | Lee | |
| 6,385,245 B1 * | 5/2002 | De Haan et al. | 375/240.16 |
| 6,584,155 B2 * | 6/2003 | Takeda et al. | 375/240.16 |
| 6,823,012 B2 * | 11/2004 | Song | 375/240.16 |
| 2002/0181589 A1 * | 12/2002 | Wake et al. | 375/240.14 |
| 2004/0247031 A1 * | 12/2004 | Hagai et al. | 375/240.16 |

FOREIGN PATENT DOCUMENTS

| | | |
|---|---|---|
| JP | 03-092979 | 4/1991 |
| JP | 04-078286 | 12/1992 |
| JP | 2004-078286 | 12/1992 |
| JP | 05-219499 | 8/1993 |
| JP | 01-136533 | 5/2001 |
| JP | 01-251628 | 9/2001 |
| WO | WO 00/34920 | 6/2000 |
| WO | WO 02/73974 | 1/2002 |

OTHER PUBLICATIONS de haan, Gerard et al.: "True-Motion estimation with 3-D recursive search block matching"; IEEE Tranactions on Circuits and Systems for Video Technology, vol. 3., No. 5, Oct. 1993, pp. 368-379.

Rovati, Fabrizio S., et al.: "An innovative, high quality and search window independent motion estimation algorithm and architectrure for MPEG-2 encoding"; IEEE Transactions on Consumer Electronics, vol. 46, No. 3, Aug. 2000, pp. 697-705.

\* cited by examiner

UNIT FOR AND METHOD OF ESTIMATING A CURRENT MOTION VECTOR

PRIORITY CLAIMS/RELATED APPLICATIONS

This application is a 371 U.S. national stage filing of (and claims the benefit and priority to under 35 U.S.C. 119 and 120) PCT/IB02/05503 filed on Dec. 12, 2002 which in turn claims the benefit of and priority under 35 U.S.C. 119 to European Patent Application Serial No. 02075179.8 filed on Jan. 17, 2002.

The invention relates to a motion estimation unit for estimating a current motion vector for a group of pixels of an image, comprising:
generating means for generating a set of candidate motion vectors for the group of pixels, with the candidate motion vectors being extracted from a set of previously estimated motion vectors;
a match error unit for calculating match errors of respective candidate motion vectors; and
a selector for selecting the current motion vector from the candidate motion vectors by means of comparing the match errors of the respective candidate motion vectors.

The invention further relates to a method of estimating a current motion vector for a group of pixels of an image, comprising:
a generating step of generating a set of candidate motion vectors for the group of pixels, with the candidate motion vectors being extracted from a set of previously estimated motion vectors;
a match error step of calculating match errors of respective candidate motion vectors; and
a select step of selecting the current motion vector from the candidate motion vectors by means of comparing the match errors of the respective candidate motion vectors.

The invention further relates to an image processing apparatus comprising:
receiving means for receiving a signal representing images;
such a motion estimation unit; and
a motion compensated image processing unit for calculating processed images on basis of the images and output of the motion estimation unit.

The invention further relates to an encoder comprising:
such a motion estimation unit;
a discrete cosine transformer;
a quantizer; and
a run-level encoder.

An embodiment of the method of the kind described in the opening paragraph is known from the article "True-Motion Estimation with 3-D Recursive Search Block Matching" by G. de Haan et. al. in IEEE Transactions on circuits and systems for video technology, vol.3, no.5, October 1993, pages 368-379.

For many applications in video signal processing, it is necessary to know the apparent velocity field of a sequence of images, known as the optical flow. This optical flow is given as a time-varying motion vector field, i.e. one motion vector field per image-pair. Notice that an image can be part of several image-pairs. In the cited article this motion vector field is estimated by dividing the image into blocks. For a set of candidate motion vectors of each block match errors are calculated and used in a minimization procedure to find the most appropriate motion vector from the set of candidate motion vectors of the block. The match error corresponds to the SAD: sum of absolute luminance differences between pixels in a block of a current image, and the pixels of a block in a reference image shifted by the motion vector. If the reference image and the current image directly succeed each other the SAD can be calculated with:

$$SAD(x, y, d_x, d_y, n) := \sum_{i=0}^{N} \sum_{j=0}^{M} |Y(x+i, y+j, n) - Y(x+d_x+i, y+d_y+j, n+1)| \quad (1)$$

Here (x,y) is the position of the block, $(d_x,d_y)$ is a motion vector, n is the image number, N and M are the width and height of the block, and Y(x, y, n) is the value of the luminance of a pixel at position (x,y) in image n.

The set of candidate motion vectors comprises motion vectors which are extracted from a set of previously estimated motion vectors and random motion vectors. The set comprises motion vectors being calculated for the same motion vector field as the current motion vector under consideration belongs to. These motion vectors are called "spatial candidates". The set might also comprise motion vectors being calculated for another motion vector field. These latter motion vectors are called "temporal candidates". The choice for "spatial candidates" as motion vector candidates for the current block of pixels under consideration is based on the assumption that several blocks of pixels correspond to one and the same object in a scene being imaged. The choice for "temporal candidates" as motion vector candidates for the current block of pixels under consideration is based on the assumption that objects in a scene being imaged, move with a constant velocity. However both assumptions are not always true. The result is that convergence in finding the appropriate motion vectors of the motion vector fields is not optimal.

It is an object of the invention to provide a motion estimation unit of the kind described in the opening paragraph which has a relative fast convergence in finding the appropriate motion vectors of the motion vector fields.

The object of the invention is achieved in that the motion estimation unit is arranged to add a further candidate motion vector to the set of candidate motion vectors by calculating this motion vector on basis of a first motion vector and a second motion vector, both belonging to the set of previously estimated motion vectors. In stead of just taking motion vectors which are found applicable for other portions of the image or for other images, now candidate motion vectors are calculated based on multiple motion vectors.

An advantage of the proposed scheme is that it takes into account more information, which results in a more accurate estimation of candidate motion vectors. The obtained accuracy in estimation allows a new trade-off point between the number of candidate motion vectors and the convergence of the accuracy of the motion estimation unit. This is beneficial for scalable motion estimation schemes.

Another advantage is that different motion models can be taken into account. Examples of such motion models are most recent velocity, most recent acceleration, zoom or rotation. The type of motion model is related with the used previously estimated motion vectors to calculate a candidate motion vector. The first motion vector and the second motion vector might belong to one and the same motion vector field. But preferably the first motion vector and the second motion vector belong to different motion vector fields.

The set of candidate motion vectors which is tested to find the current motion vector might comprise:
"spatial candidates" extracted from the set of previously estimated motion vectors;

"temporal candidates" extracted from the set of previously estimated motion vectors;

"multi-temporal candidates" calculated based on multiple "temporal candidates" extracted from the set of previously estimated motion vectors;

"multi-spatial candidates" calculated based on multiple "spatial candidates" extracted from the set of previously estimated motion vectors; and random motion vectors.

In an embodiment of the motion estimation unit according to the invention, the selector is arranged to select, from the set of candidate motion vectors, a particular motion vector as the current motion vector, if the corresponding match error is the smallest of the match errors. This is a relatively easy approach for selecting the current motion vector from the set of candidate motion vectors.

In an embodiment of the motion estimation unit according to the invention, the match error unit is designed to calculate a first one of the match errors by means of subtracting luminance values of pixels of blocks of pixels of respective images of a first image pair. In this case the group of pixels corresponds with a block of pixels. Preferably the sum of absolute luminance differences (SAD) is calculated. The SAD is a relatively reliable measure for correlation which can be calculated relatively fast.

In an embodiment of the motion estimation unit according to the invention, the first motion vector belongs to a first forward motion vector field and the second motion vector belongs to a second forward motion vector field, with the first forward motion vector field and the second forward motion vector field being different. A forward motion vector comprises motion vectors which are calculated by comparing a block of pixels of a current image with blocks of pixels of a reference image which is succeeding the current image. Notice that succeeding does not mean that there are no other images in between the current and the reference image. Suppose there is a series of images comprising, image 0, image 1, image 2 and image 3, respectively. Then the following forward motion vectors could be estimated with image 0 as current image: V(0,1), i.e. with image 1 being the reference image, V(0,2), i.e. with image 2 being the reference image and V(0,3), i.e. with image 3 being the reference image. Though the general proposed scheme allows any kind of computation on the motion vector fields, the focus is on simple to implement, low-cost, element-wise operations, i.e., the further candidate motion vector is based on two previously calculated motion vectors. Examples are:

to calculate the further candidate motion vector by means of subtraction of the first motion vector from the second motion vector;

to calculate the further candidate motion vector by means of subtraction of the second motion vector from the first motion vector; and to calculate the further candidate motion vector by means of multiplication of the second motion vector with a predetermined constant and subtraction of the first motion vector. Multiplication of a motion vector with a predetermined constant can be implemented by means of summation.

In an embodiment of the motion estimation unit according to the invention, the first motion vector belongs to a fourth forward motion vector field and the second motion vector belongs to a backward motion vector field. A backward motion vector comprises motion vectors which are calculated by comparing a block of pixels of a current image with blocks of pixels of a reference image which is preceding the current image. Notice that preceding does not mean that there are no other images in between the current and the reference image. Suppose there is a series of images comprising, image 0, image 1, image 2 and image 3, respectively. Then the following backward motion vectors could be estimated with image 3 as current image: V(3,2), i.e. with image 2 being the reference image, V(3,1), i.e. with image 1 being the reference image and V(3,0), i.e. with image 0 being the reference image. The further candidate motion vector might be based on two previously calculated motion vectors. An example is to calculate the further candidate motion vector by means of multiplication of the first motion vector with a predetermined constant and summation of the second motion vector. An advantage of combining motion vectors from forward motion vector fields and backward motion vector fields is that motion vectors corresponding to images with a relatively small time difference with the current image can be applied.

It is advantageous to apply an embodiment of the motion estimation unit according to the invention in a video encoder, e.g. MPEG encoder. Especially in MPEG encoders it is common to calculate multiple motion vector fields for an image. These motion vectors are temporarily stored. Applying some of these multiple motion vector fields to calculate candidate motion vectors is advantageous. In MPEG encoders it is known to calculate candidate motion vectors by means of scaling a single previously estimated motion vector. In some cases, the calculation of multi-temporal estimates is of lower computational complexity than scaling motion vectors. Whereas scaling requires multiplication with complicated factors (not easily decomposed in simple binary shift and add operations), the multi-temporal candidate motion vector can be computed with simple shift and add operations. Modifications of the encoder and variations thereof may correspond to modifications and variations thereof of the motion estimation unit described.

A multi-temporal candidate can be calculated based on two or more previously estimated motion vectors. The type of calculation for the multi-temporal candidate depends on which of the previously estimated motion vectors are available. The type of calculation can be controlled by the time differences between the current image and the available previously estimated motion vectors. Another parameter which can be of influence for the selection of a previously estimated motion vector is the match error of the previously estimated motion vector. Knowledge of the apparent motion model is also relevant.

It is advantageous to apply an embodiment of the motion estimation unit according to the invention in an image processing apparatus as described in the opening paragraph. The image processing apparatus may comprise additional components, e.g. a display device for displaying the processed images or storage means for storage of the processed images. The motion compensated image processing unit might support one or more of the following types of image processing:

De-interlacing: Interlacing is the common video broadcast procedure for transmitting the odd or even numbered image lines alternately. De-interlacing attempts to restore the full vertical resolution, i.e. make odd and even lines available simultaneously for each image;

Up-conversion: From a series of original input images a larger series of output images is calculated. Output images are temporally located between two original input images; and Temporal noise reduction. This can also involve spatial processing, resulting in spatial-temporal noise reduction.

Modifications of the image processing apparatus and variations thereof may correspond to modifications and variations thereof of the motion estimation unit described.

These and other aspects of the motion estimation unit, of the encoder, of the method and of the image processing apparatus according to the invention will become apparent from and will be elucidated with respect to the implementations and embodiments described hereinafter and with reference to the accompanying drawings, wherein.

Corresponding reference numerals have the same meaning in all of the Figs.

Figure 1:
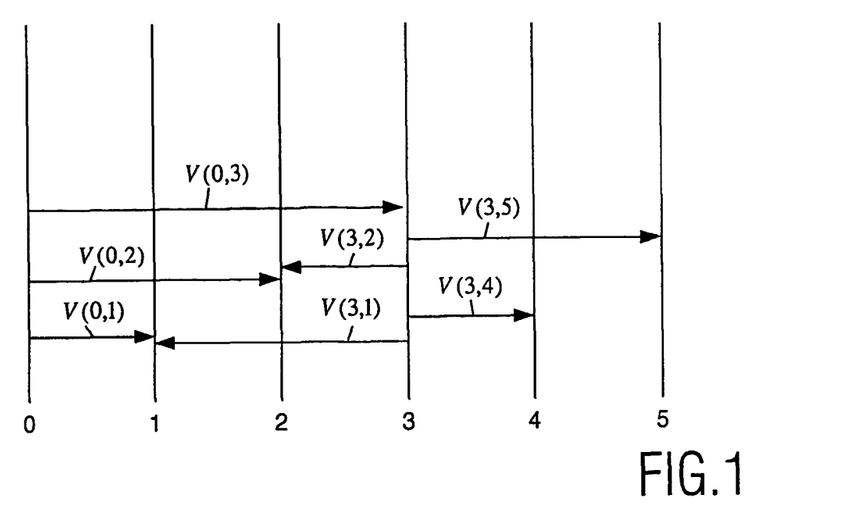
FIG. 1 schematically shows the relations between a number of consecutive images and motion vectors.

FIG. 1 schematically shows the relations between a number of consecutive images 0,1,2,3,4,5 and motion vectors V(c, r) with c∈{0,3} and r∈{0,1,2,3,4,5}. The syntax is as follows. For example, a forward motion vector related to an image pair comprising image 0 and image 1 is denoted as V(0,1). A backward motion vector related to an image pair comprising image 2 and image 3 is denoted as V(3,2). In principle, other values of c and r are possible.

Figure 2A:
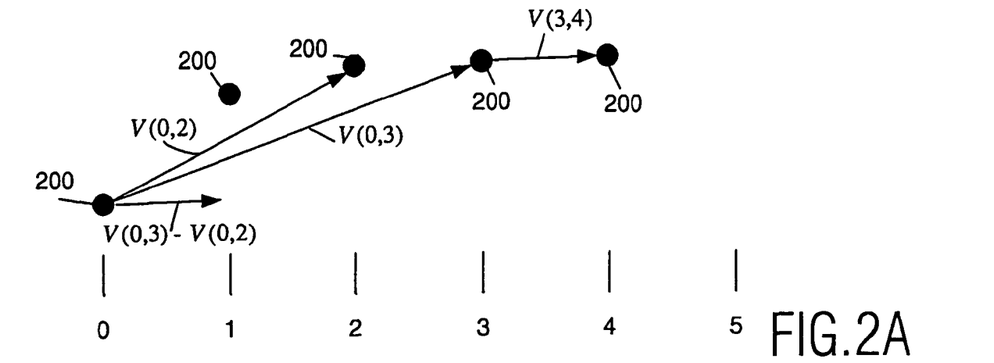
FIGS. 2A, 2B, 2C and 2D schematically show examples of relations between motion vectors belonging to a moving object, in order to illustrate that a multi-temporal candidate motion vector can be calculated by means of two previously estimated motion vectors.

FIG. 2A schematically shows an example of a relation between motion vectors belonging to a moving object 200. It is to illustrate that a multi-temporal candidate motion vector $\tilde{V}(3,4)$ can be calculated by means of two previously estimated motion vectors. Assume that the following motion vectors have already been estimated: V(0,2) and V(0,3). Now a multi-temporal candidate motion vector $\tilde{V}(3,4)$ has to be calculated. This can be achieved by applying Equation 2:

$$\tilde{V}(3,4) = V(0,3) - V(0,2) \quad (2)$$

This means that $\tilde{V}(3,4)$ is an extrapolated motion vector which is calculated by means of subtraction of two preceding forward motion vectors.

Figure 2B:
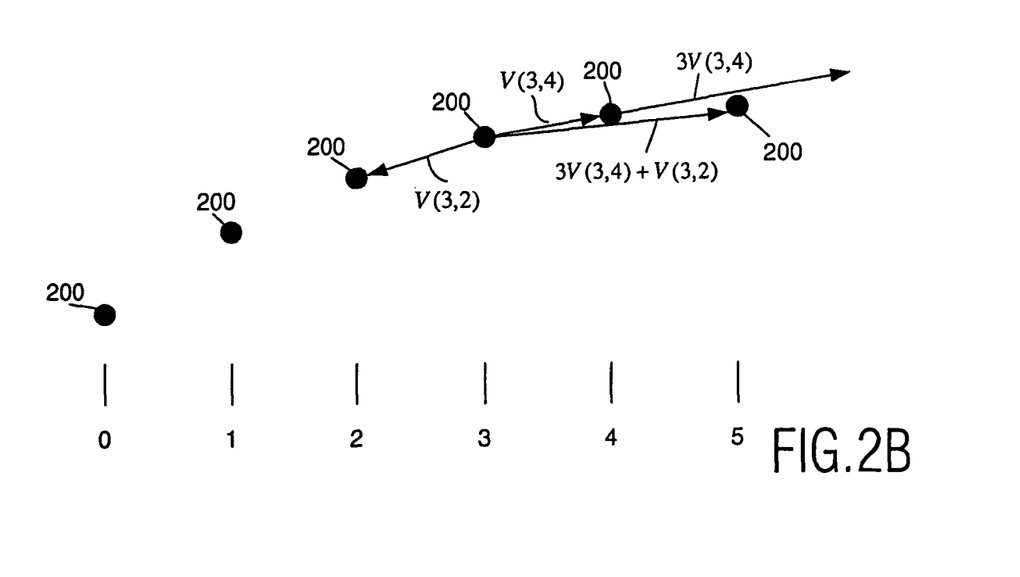

FIG. 2B schematically shows another example of a relation between motion vectors belonging to a moving object 200. Assume that the following motion vectors have already been estimated: V(3,4) and V(3,2). Now a multi-temporal candidate motion vector $\tilde{V}(3,5)$ has to be calculated. This can be achieved by applying Equation 3:

$$\tilde{V}(3,5) = 3V(3,4) + V(3,2) \quad (3)$$

This means that $\tilde{V}(3,5)$ is an extrapolated motion vector which is calculated by means of summation of a forward motion vector multiplied by a predetermined constant and a backward motion vector.

Figure 2C:
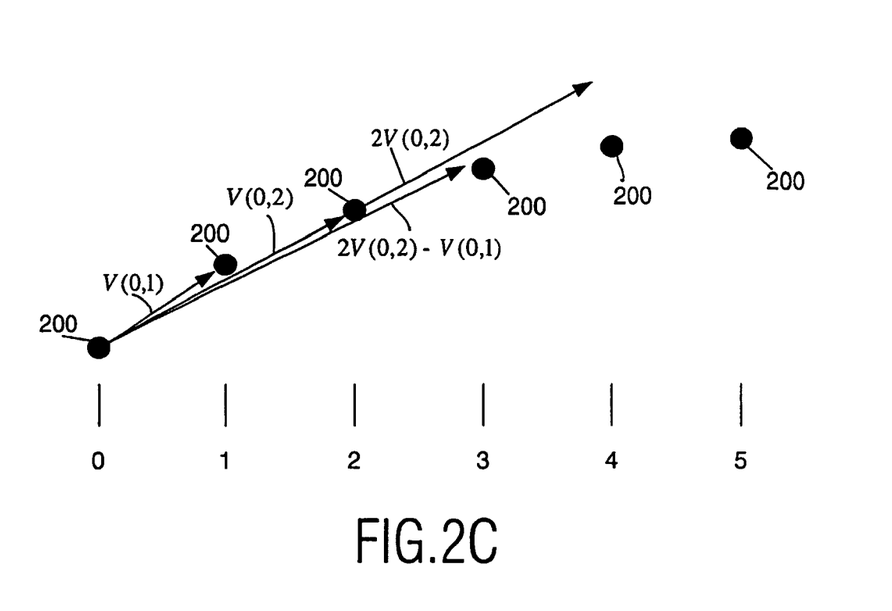

FIG. 2C schematically shows another example of a relation between motion vectors belonging to a moving object 200. Assume that the following motion vectors have already been estimated: V(0,2) and V(0,1). Now a multi-temporal candidate motion vector $\tilde{V}(0,3)$ has to be calculated. This can be achieved by applying Equation 4:

$$\tilde{V}(0,3) = 2V(0,2) - V(0,1) \quad (4)$$

This means that $\tilde{V}(0,3)$ is an extrapolated motion vector which is calculated by means of subtraction of a forward motion vector from another forward motion vector which has been multiplied by a predetermined constant.

Figure 2D:
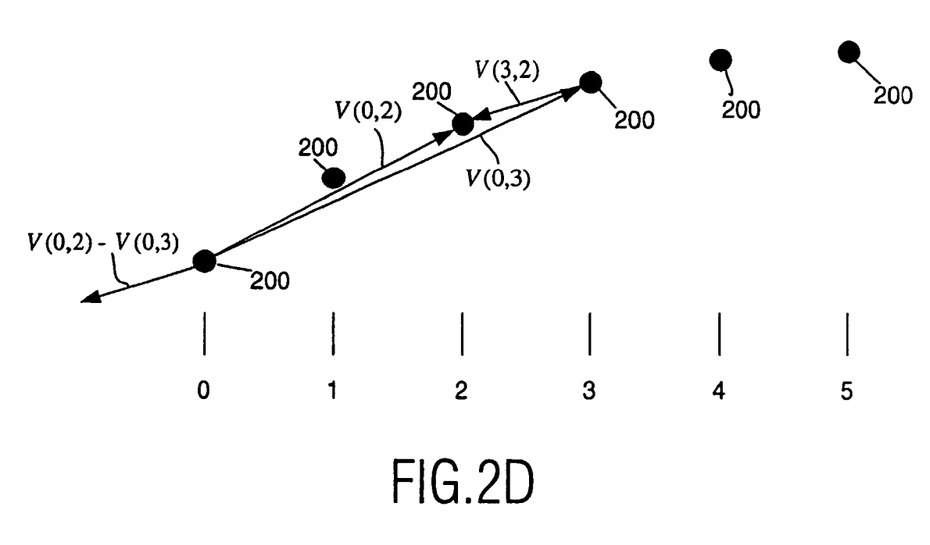

FIG. 2D schematically shows another example of a relation between motion vectors belonging to a moving object 200. Assume that the following motion vectors have already been estimated: V(0,2) and V(0,3). Now a multi-temporal candidate motion vector $\tilde{V}(3,2)$ has to be calculated. This can be achieved by applying Equation 5:

$$\tilde{V}(3,2) = V(0,2) - V(0,3) \quad (5)$$

This means that $\tilde{V}(3,2)$ is an interpolated motion vector which is calculated by means of subtraction of a forward motion vector from another forward motion vector.

Figure 3:
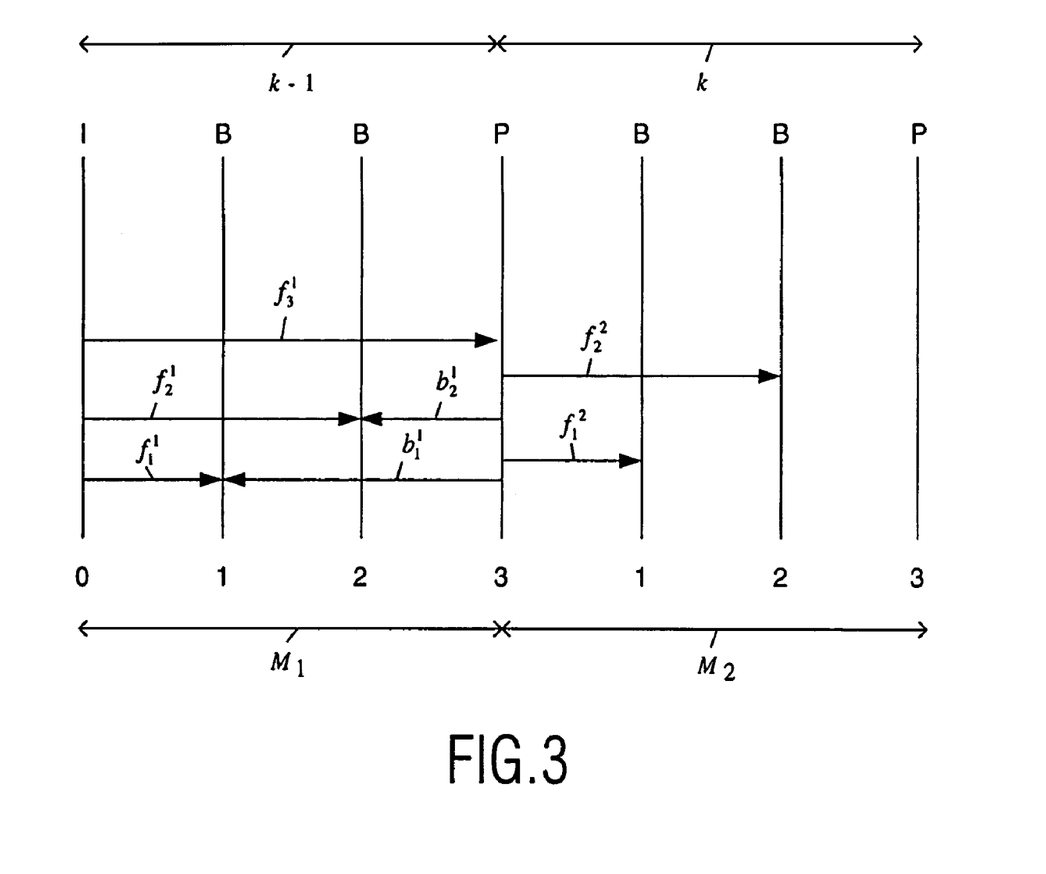
FIG. 3 schematically shows the relations between motion vectors and a number of consecutive pictures as known in MPEG encoding.

FIG. 3 schematically shows the relations between motion vectors and a number of consecutive pictures IBBPBB as known in MPEG encoding. In MPEG, there are I, P, and B picture types. Both I and P pictures serve as reference images. The P pictures are forward predicted from the previous reference image. The B pictures are bi-directionally predicted from a previous and future reference image. A group of pictures (GOP) comprises subgroups k of the form (I/P)BB ... B(I/P). Notice that in FIG. 3 it is assumed that k=2. The number of pictures within a subgroup 1 or subgroup 2, analogous to the prediction depth M of a GOP, is denoted by $M_1$ and $M_2$. In general, $M_k$ is not necessarily fixed. An alternative syntax is used for the motion vectors. A forward motion vector, which is used in the prediction of the $i^{th}$ picture of the $k^{th}$ subgroup, is denoted by $f_i^k$. The backward motion vector is denoted by $b_i^k$.

Next, generalizations of the examples described in connection with FIG. 2A, FIG. 2B, FIG. 2C and FIG. 2D will be provided. The alternative syntax is used for that. It is assumed that $M_k = M_{k-1} = 3$. Equation (2) can be generalized to:

$$\tilde{f}_1^k = f_{M_{k-1}}^{k-1} - f_{M_{k-1}-1}^{k-1} \quad (6)$$

The underlying motion model is "most recent velocity". In this case, motion vectors belonging to another subgroup are used to calculate the multi-temporal candidate motion vector. Notice that taking into account the assumptions which are applicable for FIG. 3 yields:

$$\tilde{f}_1^2 = f_3^1 - f_2^1 \quad (7)$$

This corresponds with the example provided in FIG. 2A.

Equation (3) can be generalized to:

$$\tilde{f}_2^k = 3f_1^k + b_{M_{k-1}-1}^{k-1} \quad (8)$$

The underlying motion model is "most recent acceleration". In this case a motion vector belonging to another subgroup is used together with a motion vector from the same subgroup to calculate the multi-temporal candidate motion vector. Notice that taking into account the assumptions which are applicable for FIG. 3 yields:

$$\tilde{f}_2^2 = 3f_1^2 + b_2^1 \quad (9)$$

This corresponds with the example provided in FIG. 2B.
Equation (4) can be generalized to:

$$\tilde{f}_i^k = 2 f_{i-1}^k - f_{i-2}^k \quad (10)$$

The underlying motion model is "most recent velocity". In this case motion vectors belonging to the same subgroup are used to calculate the multi-temporal candidate motion vector. Assume that i=3. Taking into account the assumptions which are applicable for FIG. 3 yields:

$$\tilde{f}_3^2 = 2 f_2^2 - f_1^2 \quad (11)$$

This corresponds with the example provided in FIG. 2C.
Equation (5) can be generalized to:

$$\tilde{b}_i^k = f_i^k - f_{M_k}^k \quad (12)$$

In this case motion vectors belonging to the same subgroup are used to calculate the multi-temporal candidate motion vector. Assume that i=2. Taking into account the assumptions which are applicable for FIG. 3 yields:

$$\tilde{b}_2^2 = f_2^2 - f_3^2 \quad (13)$$

This corresponds with the example provided in FIG. 2D.

Figure 4:
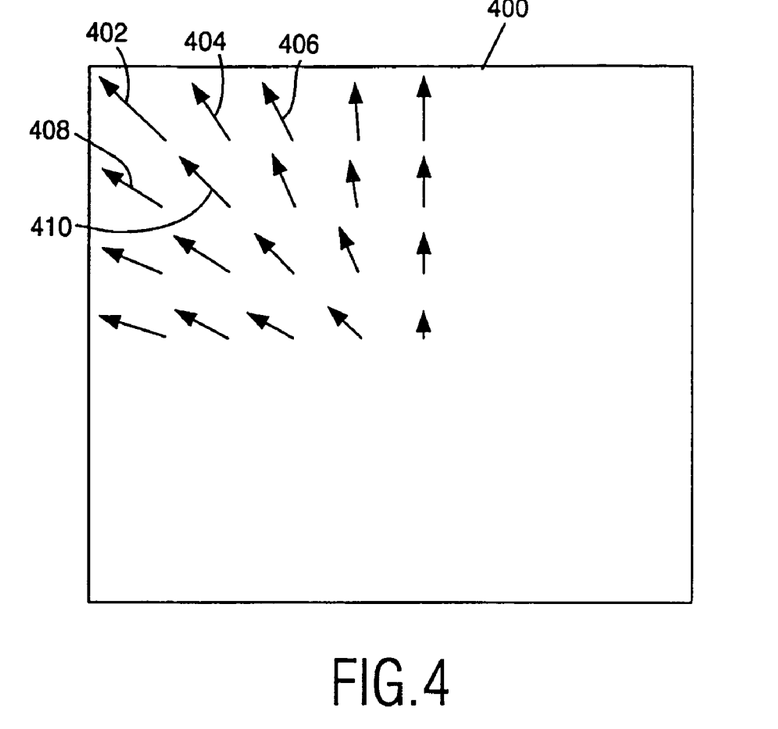
FIG. 4 schematically shows a portion of a motion vector field.

FIG. 4 schematically shows a portion of a motion vector field 400 comprising the motion vectors 402-410. The motion vector field 400 is related to a zoom. Although the various motion vectors 402-410 are different they contain shared information, i.e. the parameters of the motion model. Extracting these parameters from previously calculated motion vectors is the first step. The second step is to apply this information for the calculation of a candidate motion vector. That means a multi-spatial candidate motion vector. The process resulting in this candidate motion vector, can be based on interpolation and/or extrapolation schemes which correspond with those described above.

Figure 5:
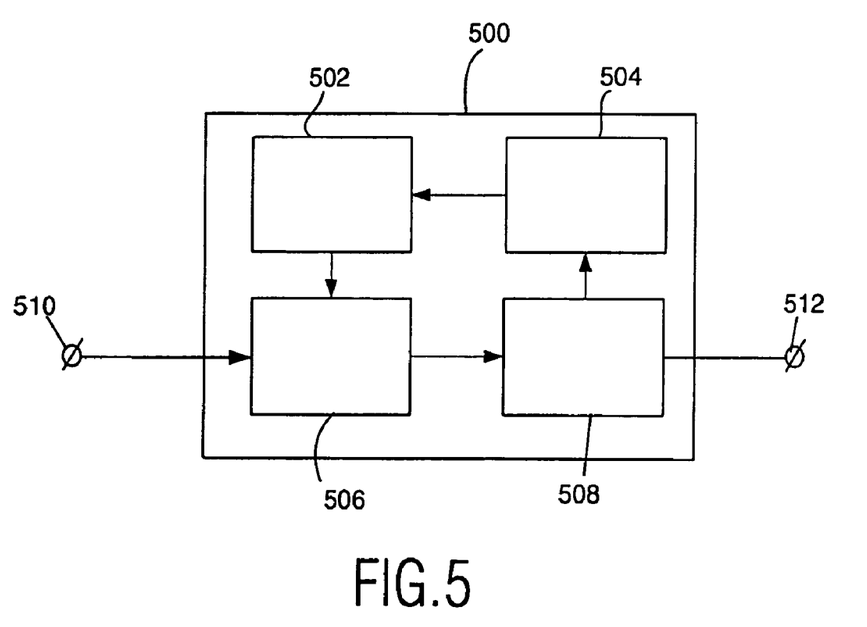
FIG. 5 schematically shows an embodiment of a motion estimation unit, according to the invention.

FIG. 5 schematically shows an embodiment of a motion estimation unit 500, comprising:
- a generating means 502 for generating a set of candidate motion vectors for a block of pixels of a current image;
- a match error unit 506 for calculating match errors of respective candidate motion vectors of the block of pixels by summation of absolute differences between pixel values of the block of pixels and pixel values of a reference image;
- a storage 504 for storing estimated motion vectors and the corresponding match errors; and
- a selector 508 for selecting a current motion vector from the candidate motion vectors by means of comparing the match errors of the respective candidate motion vectors.

The input of the motion estimation unit 500 comprises images and is provided at an input connector 510. The output of the motion estimation unit 500 are motion vector fields and is provided at an output connector 512. The behavior of the motion estimation unit 500 is as follows. First the generating means 502 generates for a block of pixels a set of candidate motion vectors. This set might comprise random motion vectors or motion vectors directly extracted from the set of previously estimated motion vectors as stored in the storage 504. But the generating means 502 is also arranged to calculate a further candidate motion vector on basis of a first motion vector and a second motion vector, both belonging to the set of previously estimated motion vectors. Such a calculation is conform with the Equations as described in connection with any of the FIGS. 2A-2D or 3 or conform with the concept as described in connection with FIG. 4. After the set of candidate motion vectors is made, the match error unit 506 calculates for these candidate motion vectors the match errors. Then the selector 508 selects a current motion vector from the set of candidate motion vectors on the basis of these match errors. This current motion vector is selected because its match error has the lowest value. The current motion vector is also stored in the storage 504.

Figure 6:
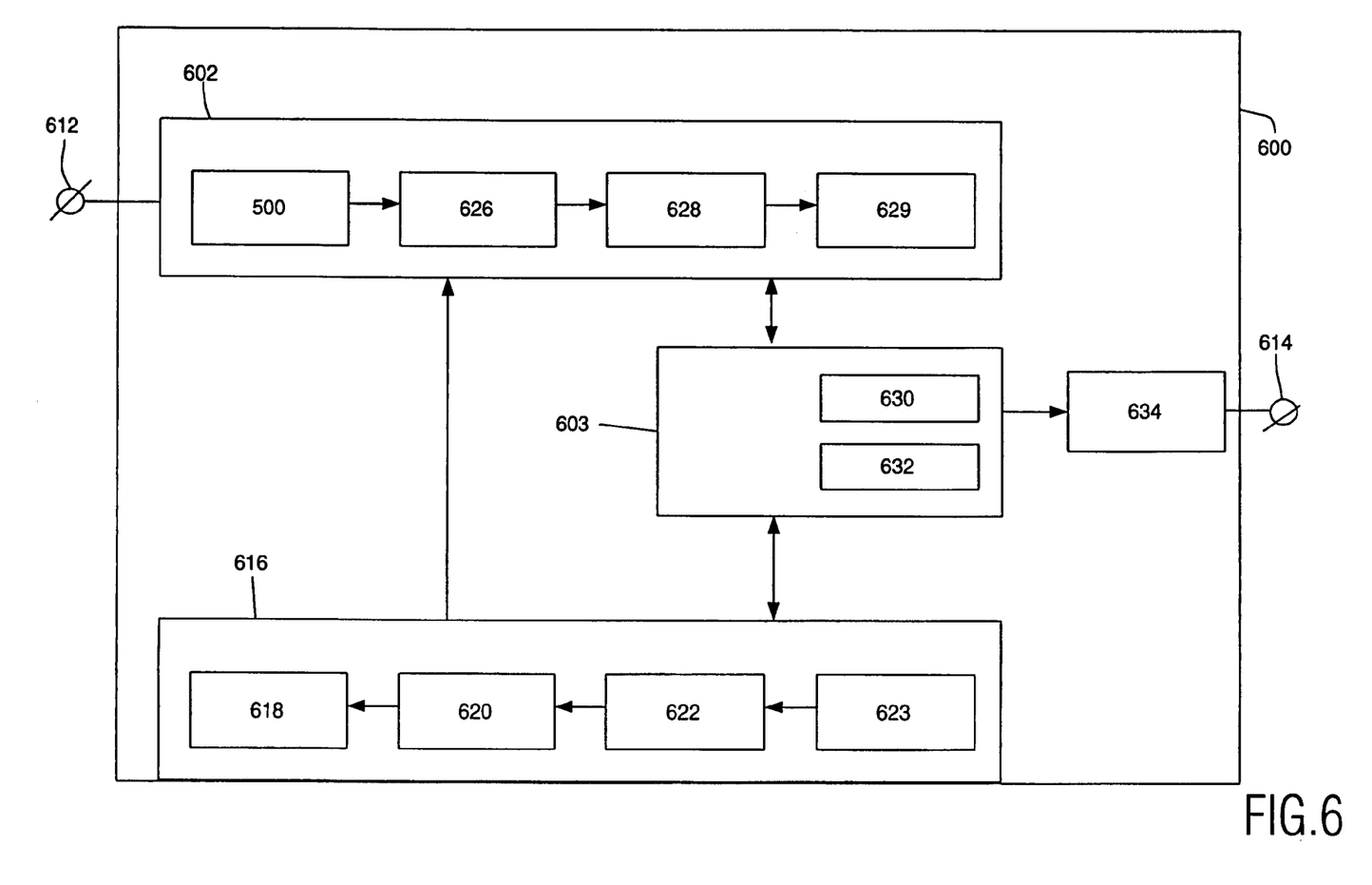
FIG. 6 schematically shows an embodiment of a video encoder, comprising a motion estimation unit, according to the invention.

FIG. 6 schematically shows an embodiment of a video encoder 600 that is designed to transform an incoming sequence of uncompressed pictures into compressed pictures. The video encoder 600 comprises:
- an encoder chain 602 having a begin and an end, and with successively: a motion estimator 500, a discrete cosine transformer 626, a quantizer 628, and a run-level encoder 629;
- a decoder chain 616 having a begin and an end, and with successively: a run-level decoder 623, an inverse quantizer 622, an inverse discrete cosine transformer 620, and a motion compensator 618;
- a variable length encoder 634; and
- a reference picture pool 603 to store previous reference pictures 630 and future reference pictures 632.

The incoming sequence of uncompressed pictures enters the video encoder 600 at its input connector 612. The coding of pictures is described on a MacroBlock basis, i.e. blocks of 16×16 pixels. Within each picture, MacroBlocks are coded in a sequence from left to right. For a given MacroBlock, the coding mode is chosen. This depends on the picture type and the effectiveness of motion compensated prediction. Depending on the coding mode, a motion compensated prediction of the contents of the MacroBlock based on past and/or future reference pictures is formed by the motion estimation unit 500. These reference pictures are retrieved from the reference picture pool 603. The prediction is subtracted from the actual data in the current MacroBlock, i.e. pixels in the uncompressed picture, to form a prediction error. Note that a prediction error is a matrix of pixels. The prediction error is input for the discrete cosine transformer 626, which divides the prediction error into 8×8 blocks of pixels and performs a discrete cosine transformation on each 8×8 block of pixels. The resulting two-dimensional 8×8 block of DCT coefficients is input for the quantizer 628 which performs a quantization. Quantization mainly affects the high frequencies. The human visual system is less sensitive for picture distortions at higher frequencies. The quantized two-dimensional 8×8 block of DCT coefficients is scanned in zigzag order and converted by the run-level encoder 629 into a one-dimensional string of quantized DCT coefficients. This string represents a compressed picture. Such a compressed picture can be stored in the reference picture pool 603 for later usage, e.g. to serve as reference picture. A compressed picture can also be converted into a variable length encoded string. This conversion is performed by the variable length encoder 634. Besides the prediction error other information, e.g. the type of the picture and motion vector field is coded in a similar way.

Motion estimation requires reference pictures. Both previous reference pictures and future reference pictures are reconstructed from compressed pictures by means of the decoder chain 616. Compressed pictures are retrieved from the reference picture pool 603 when needed. They are successively processed by the a run-level decoder 623, the inverse quantizer 622, the inverse discrete cosine transformer 620 and the motion compensator 618. These four units perform the inverse operations related to the four units of the encoder chain 602, but in reverse order. After reconstruction the reference pictures are temporarily stored in the reference picture pool 603 to be used for motion estimation for a subsequent uncompressed picture.

Figure 7:
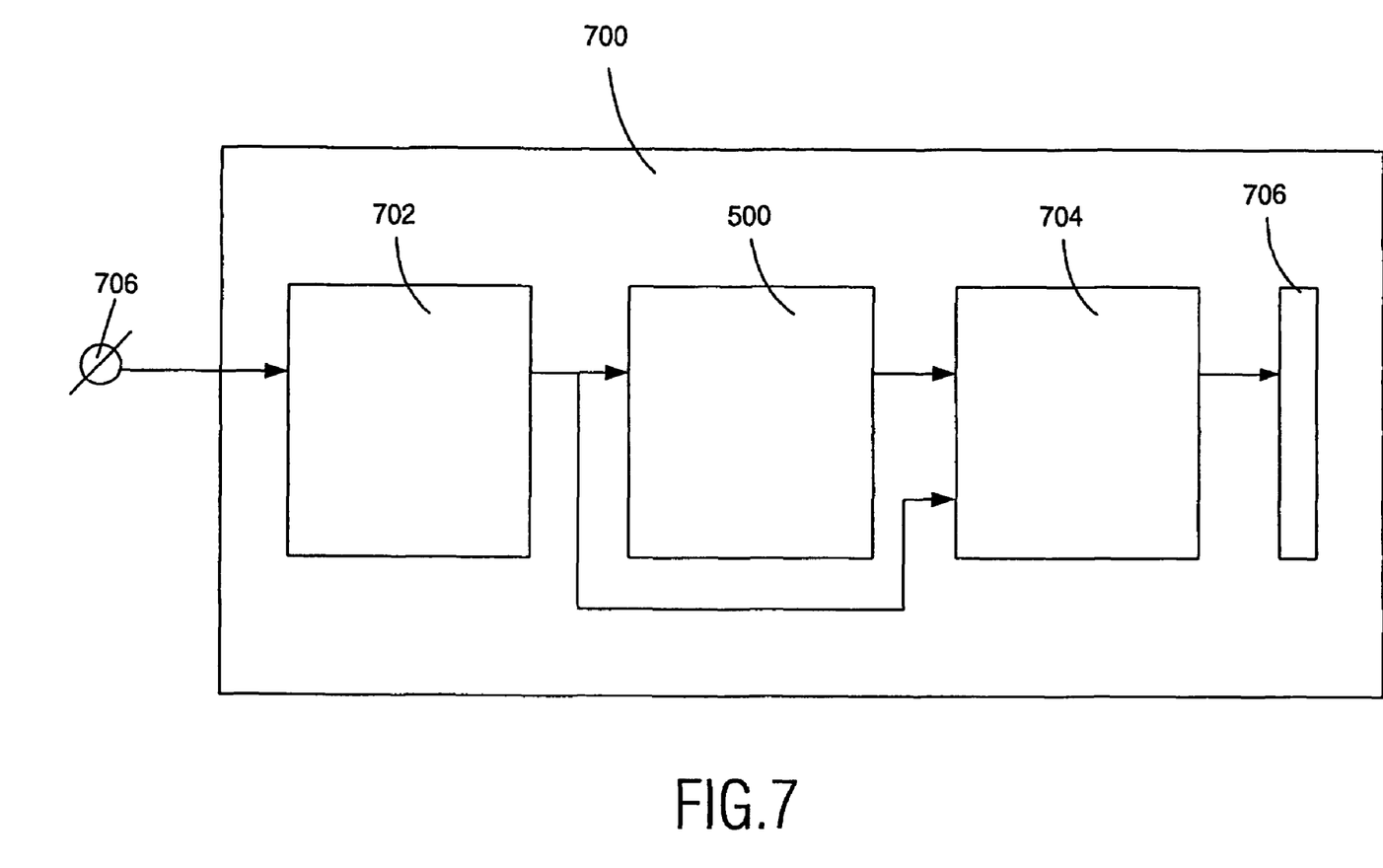
FIG. 7 schematically shows elements of an image processing apparatus, comprising a motion estimation unit, according to the invention.

FIG. 7 schematically shows elements of an image processing apparatus 700 comprising:
- receiving means 702 for receiving a signal representing images to be displayed after some processing has been performed. The signal may be a broadcast signal received via an antenna or cable but may also be a signal from a storage device like a VCR (Video Cassette Recorder) or Digital Versatile Disk (DVD). The signal is provided at the input connector 706.
- a motion estimation unit 500 as described in connection with FIG. 5;
- a motion compensated image processing unit 704; and
- a display device 706 for displaying the processed images. This display device is optional.

The motion compensated image processing unit 706 requires images and motion vectors as its input.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A motion estimation unit for estimating a current motion vector for a group of pixels of an image, comprising:
a generating unit for generating a set of candidate motion vectors for the group of pixels, with the candidate motion vectors being extracted from a set of previously estimated motion vectors;
a match error unit for calculating match errors of respective candidate motion vectors; and
a selector for selecting the current motion vector from the candidate motion vectors by means of comparing the match errors of the respective candidate motion vectors, characterized in that the motion estimation unit is arranged to add a further candidate motion vector to the set of candidate motion vectors by calculating the further candidate motion vector on basis of a first motion vector and a second motion vector, both belonging to the set of previously estimated motion vectors
wherein the motion estimation unit calculates the further candidate motion vector on basis of the first motion vector and the second motion vector, with the first motion vector belonging to a first forward motion vector field and the second motion vector belonging to a second forward motion vector field, with the first forward motion vector field and the second forward motion vector field being different; and
wherein the motion estimation unit arranges to calculate the further candidate motion vector by means of calculating a difference between the second motion vector and the first motion vector.

2. A motion estimation unit as claimed in claim 1, characterized in that the selector is arranged to select, from the set of candidate motion vectors, a particular motion vector as the current motion vector, if the corresponding match error is the smallest of the match errors.

3. A motion estimation unit as claimed in claim 1, characterized in that the match error unit is designed to calculate a first one of the match errors by means of subtracting luminance values of pixels of blocks of pixels of respective images of a first image pair.

4. A motion estimation unit as claimed in claim 1, characterized in being arranged to calculate the further candidate motion vector by means of subtraction of the first motion vector from the second motion vector.

5. A motion estimation unit as claimed in claim 1, characterized in being arranged to calculate the further candidate motion vector on basis of the first motion vector and the second motion vector, with the second motion vector belonging to the second forward motion vector field and the first motion vector belonging to a third forward motion vector field, with the second forward motion vector field and the third forward motion vector field being different.

6. A motion estimation unit as claimed in claim 5, characterized in being arranged to calculate the further candidate motion vector by means of multiplication of the second motion vector with a predetermined constant and subtraction of the first motion vector.

7. A motion estimation unit as claimed in claim 1, characterized in being arranged to calculate the further candidate motion vector on basis of the first motion vector and the second motion vector, with the first motion vector belonging to a fourth forward motion vector field and the second motion vector belonging to a first backward motion vector field.

8. A motion estimation unit claimed in claim 7, characterized in being arranged to calculate the further candidate motion vector by means of multiplication of the first motion vector with a predetermined constant and summation of the second motion vector .

9. A motion estimation unit as claimed in claim 1, characterized in being arranged to calculate the further candidate motion vector on basis of the first motion vector and the second motion vector, with the first motion vector and the second motion vector belonging to a particular motion vector field.

10. The motion estimation unit of claim 1, wherein the further candidate motion vector belongs to a first subgroup of pictures in a group of pictures, wherein the first and second motion vectors belong to a second subgroup of pictures in the group of pictures, and wherein the first and second subgroups of pictures correspond to different instances in time.

11. The motion estimation unit of claim 10, wherein the further candidate motion vector is a forward motion vector that is used for prediction of a first picture of a k th subgroup of pictures, the first motion vector is a forward motion vector that is used for prediction of a z th picture of a k−1 th subgroup of pictures and the second motion vector is a forward motion vector that is used for prediction of a z−1th picture of the k−1 th subgroup of pictures, and wherein the further candidate motion vector and the first and second motion vectors satisfy:

$$\tilde{f}_1^k = f_z^{k-1} - f_{z-1}^{k-1},$$

where $f_1^k$ represents the further candidate motion vector, $f_z^{k-1}$ represents the first motion vector and $f_{z-1}^{k-1}$ represents the second motion vector.

12. The motion estimation unit of claim 1, wherein the further candidate motion vector and the first motion vector belong to a first subgroup of pictures in a group of pictures, wherein the second motion vector belongs to a second subgroup of pictures in the group of pictures, and wherein the first and second subgroups of pictures correspond to different instances in time.

13. The motion estimation unit of claim 1, wherein the further candidate motion vector and the first and second motion vectors belong to the same subgroup of pictures in a group of pictures, and wherein different subgroups of pictures correspond to different instances in time.

14. The motion estimation unit of claim 13, wherein the further candidate motion vector is a forward motion vector that is used for prediction of an i th picture of a k th subgroup of pictures, the first motion vector is a forward motion vector that is used for prediction of an i−1 th picture of the k th subgroup of pictures and the second motion vector is a forward motion vector that is used for prediction of an i−2 th picture of the k th subgroup of pictures, and wherein the further candidate motion vector and the first and second motion vectors satisfy:

$$\tilde{f}_i^k = f_{i-1}^k - f_{i-2}^k,$$

where $f_i^k$ represents the further candidate motion vector, $f_{i-1}^k$ represents the first motion vector and $f_{i-2}^k$ represents the second motion vector.

15. The motion estimation unit of claim 1, wherein the set of previously estimated motion vectors belong to the same motion vector field that is related to a zoom.

16. A motion estimation unit for estimating a current motion vector for a group of pixels of an image, comprising:
a generating unit for generating a set of candidate motion vectors for the group of pixels, with the candidate motion vectors being extracted from a set of previously estimated motion vectors;
a match error unit for calculating match errors of respective candidate motion vectors; and
a selector for selecting the current motion vector from the candidate motion vectors by means of comparing the match errors of the respective candidate motion vectors, characterized in that the motion estimation unit is arranged to add a further candidate motion vector to the set of candidate motion vectors by calculating the further candidate motion vector on basis of a first motion vector and a second motion vector, both belonging to the set of previously estimated motion vectors;
wherein the motion estimation unit arranges to calculate the further candidate motion vector on basis of the first motion vector and the second motion vector, with the first motion vector belonging to a fourth forward motion vector field and the second motion vector belonging to a first backward motion vector field; and
wherein the motion estimation unit arranges to calculate the further candidate motion vector by means of multiplication of the first motion vector with a predetermined constant and summation of the second motion vector.

17. A motion estimation unit for estimating a current motion vector for a group of pixels of an image, comprising:
a generating unit for generating a set of candidate motion vectors for the group of pixels, with the candidate motion vectors being extracted from a set of previously estimated motion vectors;
a match error unit for calculating match errors of respective candidate motion vectors; and
a selector for selecting the current motion vector from the candidate motion vectors by means of comparing the match errors of the respective candidate motion vectors, characterized in that the motion estimation unit is arranged to add a further candidate motion vector to the set of candidate motion vectors by calculating the further candidate motion vector on basis of a first motion vector and a second motion vector, both belonging to the set of previously estimated motion vectors;

wherein the further candidate motion vector belongs to a first subgroup of pictures in a group of pictures, wherein the first and second motion vectors belong to a second subgroup of pictures in the group of pictures, and wherein the first and second subgroups of pictures correspond to different instances in time; and
wherein the further candidate motion vector is a forward motion vector that is used for prediction of a first picture of a k th subgroup of pictures, the first motion vector is a forward motion vector that is used for prediction of a z th picture of a k−1 th subgroup of pictures and the second motion vector is a forward motion vector that is used for prediction of a z−1th picture of the k−1 th subgroup of pictures, and wherein the further candidate motion vector and the first and second motion vectors satisfy:

$$\tilde{f}_1^k = f_z^{k-1} - f_{z-1}^{k-1},$$

where $f_1^k$ represents the further candidate motion vector, $f_z^{k-1}$ represents the first motion vector and $f_{z-1}^{k-1}$ represents the second motion vector.

18. A motion estimation unit for estimating a current motion vector for a group of pixels of an image, comprising:
a generating unit for generating a set of candidate motion vectors for the group of pixels, with the candidate motion vectors being extracted from a set of previously estimated motion vectors;
a match error unit for calculating match errors of respective candidate motion vectors; and
a selector for selecting the current motion vector from the candidate motion vectors by means of comparing the match errors of the respective candidate motion vectors, characterized in that the motion estimation unit is arranged to add a further candidate motion vector to the set of candidate motion vectors by calculating the further candidate motion vector on basis of a first motion vector and a second motion vector, both belonging to the set of previously estimated motion vectors;
wherein the further candidate motion vector and the first and second motion vectors belong to the same subgroup of pictures in a group of pictures, and different subgroups of pictures correspond to different instances in time; and
wherein the further candidate motion vector is a forward motion vector that is used for prediction of an i th picture of a k th subgroup of pictures, the first motion vector is a forward motion vector that is used for prediction of an i−1 th picture of the k th subgroup of pictures and the second motion vector is a forward motion vector that is used for prediction of an i−2 th picture of the k th subgroup of pictures, and wherein the further candidate motion vector and the first and second motion vectors satisfy:

$$\tilde{f}_i^k = f_{i-1}^k - f_{i-2}^k,$$

where $f_i^k$ represents the further candidate motion vector, $f_{i-1}^k$ represents the first motion vector and $f_{i-2}^k$ represents the second motion vector.

* * * * *